United States Patent
Shen et al.

(10) Patent No.: US 10,043,057 B2
(45) Date of Patent: Aug. 7, 2018

(54) ACCELERATING OBJECT DETECTION

(71) Applicant: Adobe Systems Incorporated, San Jose, CA (US)

(72) Inventors: Xiaohui Shen, San Jose, CA (US); Zhe Lin, Fremont, CA (US); Jonathan W. Brandt, Santa Cruz, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 72 days.

(21) Appl. No.: 15/254,587

(22) Filed: Sep. 1, 2016

(65) Prior Publication Data

US 2016/0371538 A1 Dec. 22, 2016

Related U.S. Application Data

(62) Division of application No. 14/444,560, filed on Jul. 28, 2014, now Pat. No. 9,471,828.

(51) Int. Cl.
*G06K 9/00* (2006.01)
*G06K 9/62* (2006.01)
*G06K 9/46* (2006.01)

(52) U.S. Cl.
CPC ..... *G06K 9/00268* (2013.01); *G06K 9/00228* (2013.01); *G06K 9/00281* (2013.01); *G06K 9/4676* (2013.01); *G06K 9/623* (2013.01); *G06K 9/6257* (2013.01)

(58) Field of Classification Search
CPC combination set(s) only.
See application file for complete search history.

(56) References Cited

U.S. PATENT DOCUMENTS

| 7,206,461 | B2 | 4/2007 | Steinberg et al. | |
|---|---|---|---|---|
| 7,742,623 | B1 * | 6/2010 | Moon | G06K 9/00604 382/103 |
| 8,027,521 | B1 * | 9/2011 | Moon | G06K 9/00288 382/118 |
| 8,498,455 | B2 | 7/2013 | Ke et al. | |
| 8,880,563 | B2 | 11/2014 | Lin et al. | |

(Continued)

OTHER PUBLICATIONS

"Non-Final Office Action", U.S. Appl. No. 14/444,560, dated Nov. 20, 2015, 12 pages.

(Continued)

*Primary Examiner* — Alex Liew
(74) *Attorney, Agent, or Firm* — Wolfe-SBMC

(57) ABSTRACT

Accelerating object detection techniques are described. In one or more implementations, adaptive sampling techniques are used to extract features from an image. Coarse features are extracted from the image and used to generate an object probability map. Then, dense features are extracted from high-probability object regions of the image identified in the object probability map to enable detection of an object in the image. In one or more implementations, cascade object detection techniques are used to detect an object in an image. In a first stage, exemplars in a first subset of exemplars are applied to features extracted from the multiple regions of the image to detect object candidate regions. Then, in one or more validation stages, the object candidate regions are validated by applying exemplars from the first subset of exemplars and one or more additional subsets of exemplars.

20 Claims, 8 Drawing Sheets

(56) References Cited

U.S. PATENT DOCUMENTS

| | | |
|---|---|---|
| 9,190,026 B2 | 11/2015 | Yang et al. |
| 9,424,484 B2 | 8/2016 | Shen et al. |
| 9,471,828 B2 | 10/2016 | Shen et al. |
| 9,734,434 B2 | 8/2017 | Shen et al. |
| 2003/0033347 A1 | 2/2003 | Bolle et al. |
| 2003/0053685 A1 | 3/2003 | Lestideau |
| 2003/0147558 A1 | 8/2003 | Loui et al. |
| 2005/0271279 A1 | 12/2005 | Fujimura et al. |
| 2007/0122056 A1 | 5/2007 | Steinberg et al. |
| 2007/0214172 A1 | 9/2007 | Nister et al. |
| 2008/0219558 A1 | 9/2008 | Lu et al. |
| 2008/0301133 A1 | 12/2008 | Brown et al. |
| 2009/0060351 A1 | 3/2009 | Li et al. |
| 2009/0208118 A1 | 8/2009 | Csurka |
| 2010/0046830 A1 | 2/2010 | Wang et al. |
| 2010/0226564 A1 | 9/2010 | Marchesotti et al. |
| 2011/0299743 A1 | 12/2011 | Ke et al. |
| 2012/0045132 A1 | 2/2012 | Wong et al. |
| 2012/0177294 A1 | 7/2012 | Ke et al. |
| 2012/0221572 A1 | 8/2012 | Wang et al. |
| 2012/0290577 A1 | 11/2012 | Cai et al. |
| 2013/0121600 A1 | 5/2013 | Lin et al. |
| 2013/0132377 A1 | 5/2013 | Lin et al. |
| 2013/0148881 A1 | 6/2013 | Xue |
| 2013/0148903 A1 | 6/2013 | van Zwol et al. |
| 2014/0105505 A1 | 4/2014 | Ioffe et al. |
| 2014/0254923 A1 | 9/2014 | Vidal Calleja et al. |
| 2014/0272822 A1 | 9/2014 | Yang et al. |
| 2015/0146989 A1 | 5/2015 | Shiiyama et al. |
| 2016/0019440 A1 | 1/2016 | Shen et al. |
| 2016/0027181 A1 | 1/2016 | Shen et al. |
| 2016/0292537 A1 | 10/2016 | Shen et al. |

OTHER PUBLICATIONS

"Notice of Allowance", U.S. Appl. No. 14/335,059, dated Apr. 15, 2016, 8 pages.

"Notice of Allowance", U.S. Appl. No. 14/444,560, dated Jun. 1, 2016, 12 pages.

"Restriction Requirement", U.S. Appl. No. 14/335,059, dated Feb. 22, 2016, 6 pages.

Li,"Efficient Boosted Exemplar-based Face Detection", CVPR 2014, 2014, 8 pages.

Shen,"Detecting and Aligning Faces by Image Retrieval", IEEE Conference on Computer Vision and Pattern Recognition (CVPR), 2013, pp. 4321-4328.

Shen,"Object Retrieval and Localization with Spatially-Constrained Similarity Measure and k-NN Re-Ranking", IEEE Conference on Computer Vision and Pattern Recognition (CVPR), Jun. 16-21, 2012, Jun. 16, 2012, 8 pages.

Zhu,"Face Detection, Pose Estimation, and Landmark Localization in the Wild", 2012 IEEE Conference on Computer Vision and Pattern Recognition, 2012, 8 pages.

"Notice of Allowance", U.S. Appl. No. 15/183,629, dated Apr. 10, 2017, 10 pages.

"First Action Interview Office Action", U.S. Appl. No. 15/183,629, dated Jan. 12, 2017, 3 pages.

"Corrected Notice of Allowance", U.S. Appl. No. 14/444,560, dated Sep. 16, 2016, 3 pages.

"Pre-Interview Communication", U.S. Appl. No. 15/183,629, dated Oct. 24, 2016, 3 pages.

\* cited by examiner

ACCELERATING OBJECT DETECTION

RELATED APPLICATIONS

This application is a divisional of and claims priority to U.S. patent application Ser. No. 14/444,560 filed Jul. 28, 2014 entitled "Accelerating Object Detection", the disclosure of which is incorporated by reference herein in its entirety.

BACKGROUND

Conventional object detection applications extract a significant number of multi-scale features from an image in order to enable detection of an object in the image. For example in face detection, conventional solutions may extract approximately 200,000 features in an image with a maximum dimension of 1,480. It is to be appreciated that extracting such a high number of features can be very time consuming, and thus becomes the bottleneck of conventional object detection processes in terms of speed.

To recognize an object, such as a face, conventional exemplar-based object detection methods use a large collection of exemplars as classifiers. The detection procedure is computationally expensive as the similarity between each test region and each exemplar needs to be calculated. Some recent solutions select the exemplars that are the most informative in determining the existence of objects. However, these solutions still use a relatively large number of exemplars (e.g., 3,000 exemplars) to detect an object. When 3,000 exemplars are used, the detection stage (excluding feature extraction) may take up to 2 seconds for a 1480×986 image.

SUMMARY

Accelerating object detection techniques are described. In one or more implementations, adaptive sampling techniques are used to extract features from an image. Coarse features are extracted from an image and used to generate an object probability map. Then, dense features are extracted from high-probability object regions of the image identified in the object probability map to enable detection of an object in the image.

In one or more implementations, cascade object detection techniques are used to detect an object in an image. In a first stage, features are extracted from multiple regions of the image, and exemplars in a first subset of exemplars are applied to the features extracted from the multiple regions of the image to detect object candidate regions. Then, in one or more validation stages, additional features are extracted from the object candidate regions, and the object candidate regions are validated by applying exemplars from the first subset of exemplars and one or more additional subsets of exemplars to the features and the additional features extracted from the object candidate regions.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

Figure 1:
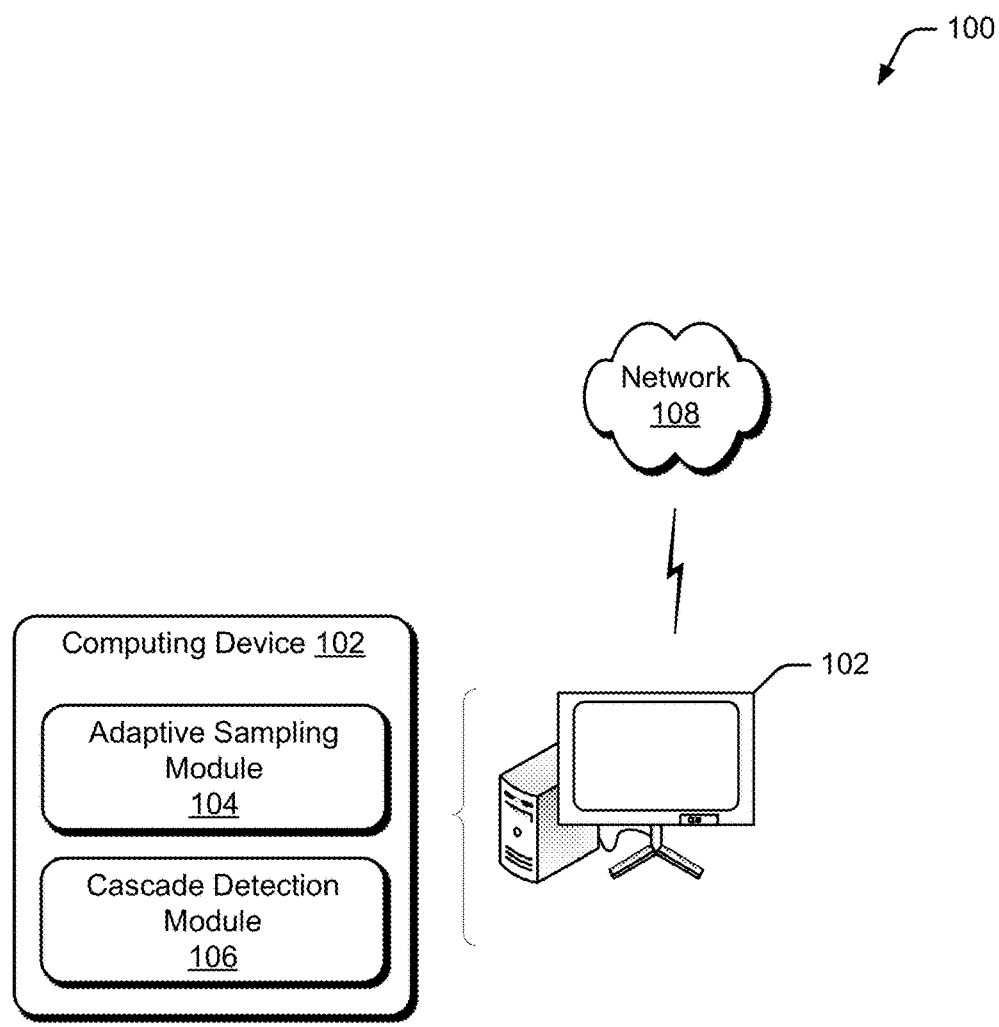
FIG. 1 illustrates an environment in an example implementation that is operable to employ techniques described herein.

Accelerating object detection techniques described herein include adaptive sampling techniques and cascade object detection techniques, which may be implemented separately or in combination to accelerate the process of detecting an object (e.g., a face) in an image.

The adaptive sampling techniques reduce the number of features that are extracted from an image, while at the same time ensuring that sufficient features are extracted from object regions of the image to enable accurate object detection. Coarse features are extracted from an image (e.g., using large sampling steps). Based on the coarse features, an object probability map is generated to indicate the possibilities where an object, such as a face, may appear in the image. For example, the object probability map may indicate "high-probability object regions" where objects are likely to occur, as well as "low-probability object regions" where objects are unlikely to occur. Then, dense features are extracted from the high-probability object regions (e.g., using small sampling steps), while less or even no features are extracted from the low-probability object regions of the image. The adaptive sampling techniques may be performed recursively in order to extract sufficient features from the high-probability object regions while suppressing the number of non-informative features that are extracted from the low-probability object regions.

The adaptive sampling techniques greatly reduce the number of features that are extracted for object detection. For example, the number of features extracted from an image for object detection can be reduced by more than 50% as compared to conventional solutions, with no performance degradation using the adaptive sampling techniques described herein. By reducing the number of features that are extracted, the adaptive sampling techniques significantly speed up the feature extraction process, while maintaining accurate object detection. Further discussion of the adaptive sampling techniques are described with reference to FIGS. 2 and 3, below.

The cascade object detection techniques use a cascade of exemplar classifiers ("exemplars") with validation to further improve the efficiency and accuracy of object detection. Conventional solutions apply all of the exemplars together in a one-step detection process. Through testing it was discovered that when using a smaller number of exemplars, the same number of objects can be detected. However, the precision of using less exemplars is not as high as when using a large number of exemplars because the detection scores of some true object regions may be lower than the scores of some false positives.

In order to reduce the detection time while maintaining the detection accuracy, the cascade object detection techniques group the exemplars into multiple subsets, and apply the subsets of the exemplars to an image in multiple cascaded stages. For example, a small subset of the exemplars is used in a first stage to detect object candidate regions, and then other subsets of the exemplars are added in one or more validation stages to validate the object candidate regions and remove the false positives.

Compared to conventional solutions that use all of the exemplars together in a one-step detection process, the cascade object detection techniques described herein may be up to seven times faster than conventional object detection solutions, while achieving better detection accuracy. Further discussion of the cascade object detection techniques are described with reference to FIGS. 4 and 5, below.

Example Environment

FIG. 1 illustrates an environment 100 in an example implementation that is operable to employ techniques described herein. Environment 100 includes a computing device 102, which may be configured in a variety of different ways.

Computing device 102, for instance, may be configured as a desktop computer, a laptop computer, a mobile device (e.g., assuming a handheld configuration such as a tablet or mobile phone), and so forth. Thus, computing device 102 may range from full resource devices with substantial memory and processor resources (e.g., personal computers, game consoles) to a low-resource device with limited memory and/or processing resources (e.g., mobile devices). Additionally, although a single computing device 102 is shown, computing device 102 may be representative of a plurality of different devices, such as multiple servers utilized by a business to perform operations "over the cloud" as further described in relation to FIG. 8.

Computing device 102 is illustrated as including an adaptive sampling module 104 and a cascade detection module 106. The adaptive sampling module 104 is representative of functionality to perform one or more techniques to extract features from an image to enable object detection. As described in more detail below, the adaptive sampling module 104 is configured to reduce the number of features that are extracted from an image, while at the same time ensuring that enough features are extracted from the object regions to enable object detection. Further discussion of the adaptive sampling module 104 may be found with reference to FIGS. 2 and 3, below.

The cascade detection module 106 is representative of functionality to perform one or more techniques to detect objects, such as faces, in an image. As described in more detail below, the cascade detection module 106 groups exemplar classifiers into multiple different subsets. The exemplars in a first subset are used to for initial object detection, while the exemplars in the remaining subsets are used for validation to remove false positives. Further discussion of the cascade detection module 106 may be found with reference to FIGS. 4 and 5, below.

Figure 8:
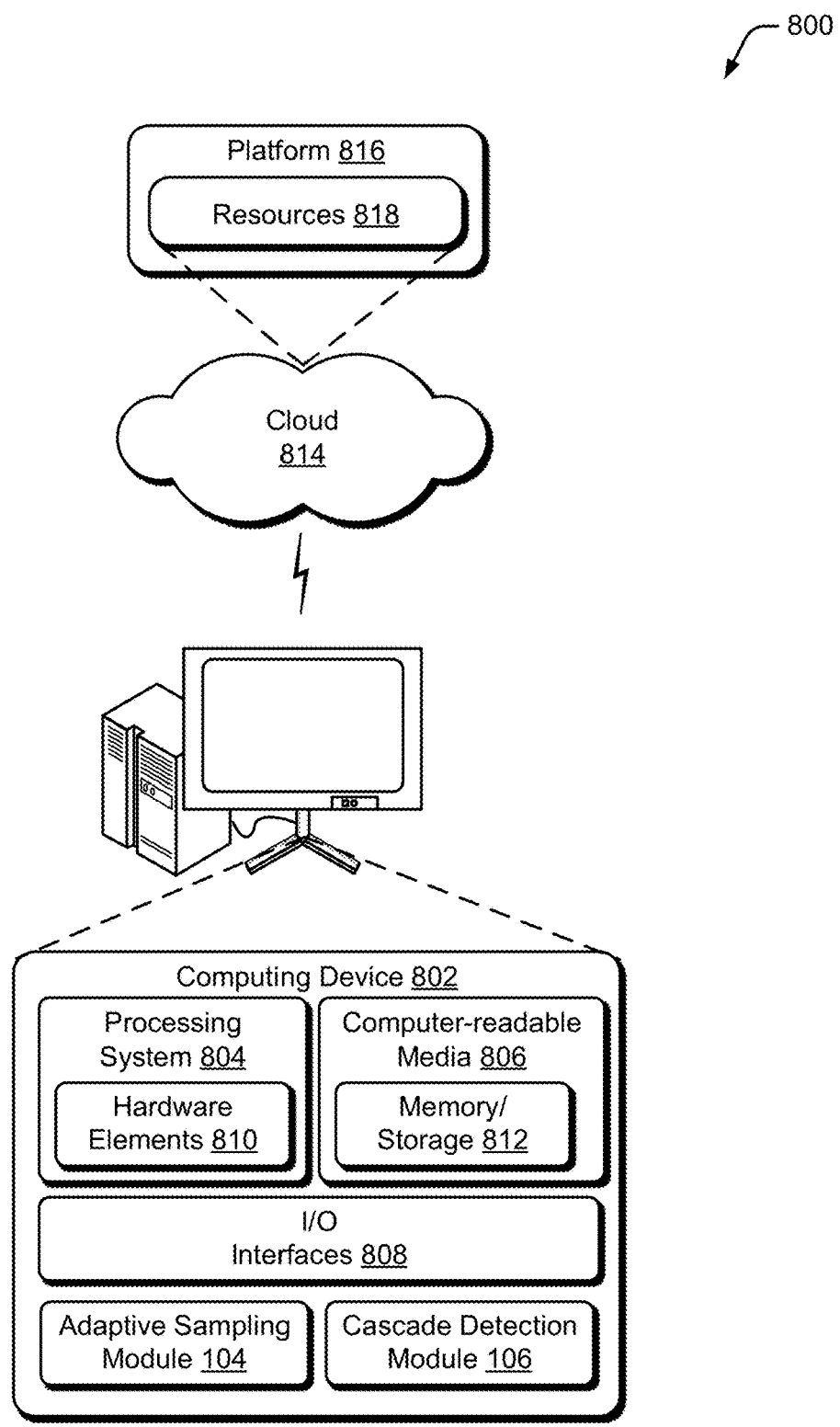
FIG. 8 illustrates an example system including various components of an example device that can be implemented as any type of computing device as described and/or utilized with reference to FIGS. 1-7 to implement embodiments of the techniques described herein.

Although illustrated as part of computing device 102, functionality of the adaptive sampling module 104 and the cascade detection module 106 may also be implemented in a distributed environment, remotely via a network 108 (e.g., "over the cloud") as further described in relation to FIG. 8, and so on. Although network 108 is illustrated as the Internet, the network may assume a wide variety of configurations. For example, network 108 may include a wide area network (WAN), a local area network (LAN), a wireless network, a public telephone network, an intranet, and so on. Further, although a single network 108 is shown, network 108 may also be configured to include multiple networks.

Adaptive Sampling Techniques

Figure 2:
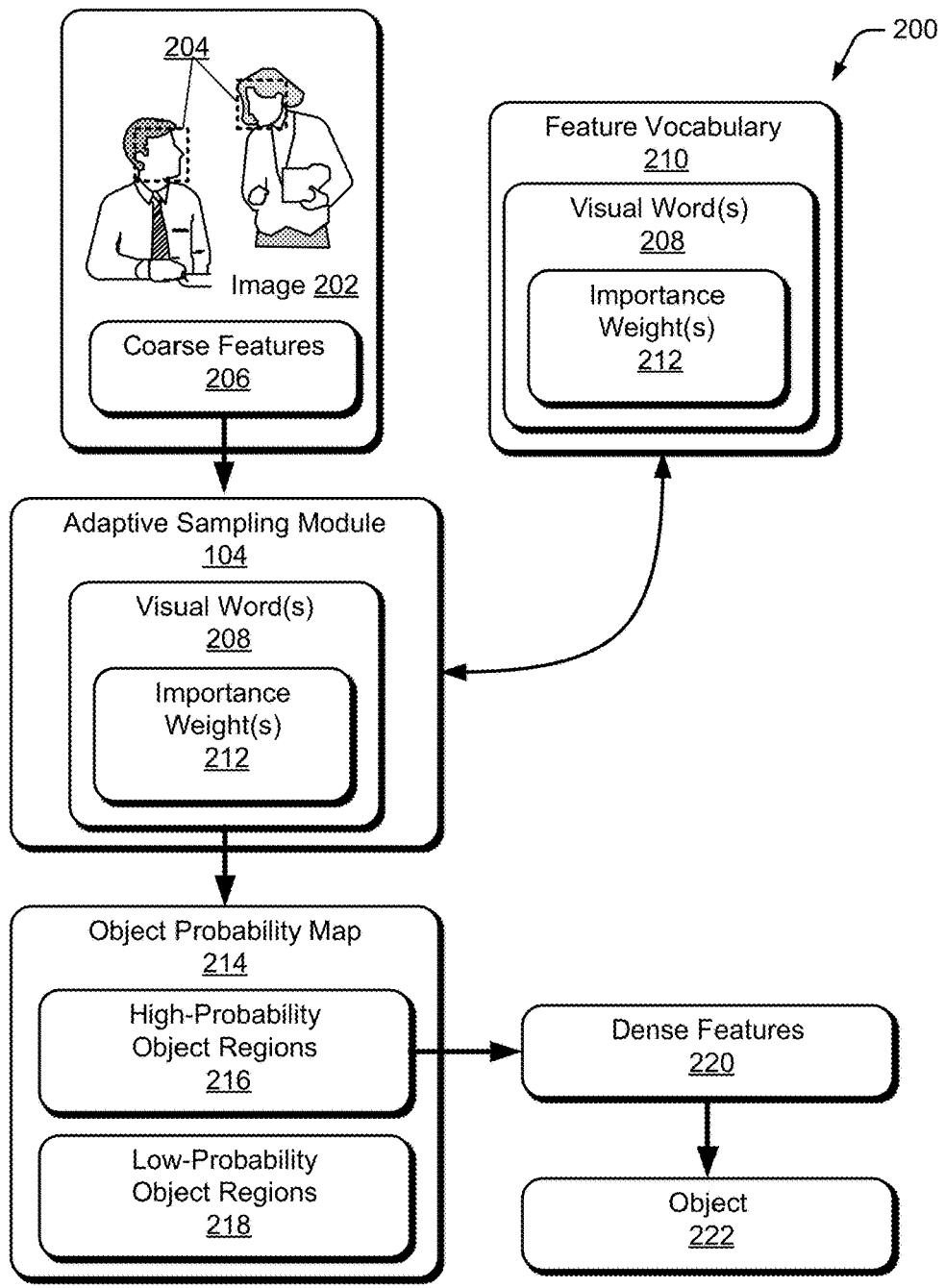
FIG. 2 illustrates a system in an example implementation in which the adaptive sampling module of FIG. 1 extracts features from an image using adaptive sampling techniques.

FIG. 2 illustrates a system 200 in an example implementation in which adaptive sampling module 104 of FIG. 1 extracts features from an image using adaptive sampling techniques.

In this example, adaptive sampling module 104 receives an image 202. Image 202 can be any type of digital image, which can be displayed on a display device of a computing system or device. Image 202 can include varying features, objects, and regions of the image, and as described herein, faces 204 of one or more persons that are detectable in the image by the adaptive sampling module 104.

Adaptive sampling module 104 extracts coarse features 206 from image 202. To extract coarse features 206 adaptive sampling module 104 may use a large sampling step. For example, in the first stage, adaptive sampling module 104 may extract one feature for every three pixels of image 202. It is to be appreciated, therefore, that by using a large sampling step, a relatively small amount of features are extracted from image 202 in the first stage.

The coarse features 206 correspond to interesting points of image 202 that can be extracted from the image to provide a feature description of the image. The feature description can be used to locate an object, such as faces 204, in the image when the image contains many other objects. In order to perform effective object recognition, it is important that the coarse features 206 are detectable under changes in image scale, noise, and illumination. Accordingly, in one or more implementations, the coarse features 206 extracted by adaptive sampling module 104 may be scale-invariant feature transform (SIFT) features. SIFT features are resilient to changes in image scale, rotation, noise, illumination, and changes in viewpoint.

In one or more implementations, adaptive sampling module 104 quantizes the extracted coarse features 206 into visual words 208. To do so, adaptive sampling module 104 accesses a feature vocabulary 210 which is previously built by clustering a large amount of features extracted from example images, in which a cluster center is called a visual word. Then, to quantize the extracted coarse features 206, adaptive sampling module 104 represents the extracted coarse features 206 by their closest visual words in the feature vocabulary 210.

Adaptive sampling module 104 then assigns an importance weight 212 to each visual word. The importance weight 212 indicates a probability that the visual word 208 corresponds to an object, such as a face. To assign the importance weight 212, adaptive sampling module 104 selects a previously-calculated importance weight that is associated with the selected visual word 208 from feature vocabulary 210. Since the importance weights 212 are previously-calculated and stored in feature vocabulary 210, assigning the importance weights is extremely fast.

Prior to storing the importance weights 212 in the feature vocabulary 210, adaptive sampling module 104 calculates the importance weights 212 by extracting features from positive training images that contain an object, as well as negative training images that do not include an object. The extracted features are then quantized to visual words. Then, for each visual word ($vw_j$), adaptive sampling module 104 obtains the occurrence of the visual word inside the positive training images ($P_j$) as well as the occurrence of the visual word inside the negative training images ($N_j$). Adaptive sampling module 104 can then use the following equation to calculate the importance weight $L(vw_j)$, which corresponds to the likelihood that the visual word ($vw_j$) is associated with an object:

$$L(vw_j) = \frac{P_j}{P_j + N_j}$$

In this equation, when the importance weight $L(vw_j)$ is higher, $vw_j$ is more important in indicating the possible locations of the object, and vice versa. Thus, adaptive sampling module 104 uses $L(vw_j)$ as the importance weight of visual word $vw_j$.

Next, adaptive sampling module 104 generates an object probability map 214 based on the extracted coarse features 206. The object probability map 214 indicates the probabilities that an object may appear at each location in image 202. The object probability map 214 includes high-probability object regions 216 that correspond to regions of image 202 that are likely to contain the object, and low-probability object regions 218 that correspond to regions of image 202 that are unlikely to contain the object.

In one or more implementations, to generate the object probability map 214, adaptive sampling module 104 accumulates the importance weights 212 assigned to the extracted coarse features 206 to generate probability scores, and assigns the probability sores to positions on the objet probability map 214 that correspond to the location of the extracted coarse features 206 in image 202.

The locations of the coarse features 206 extracted from image 202 are relatively sparse. Thus, in one or more implementations, in order to provide a smooth object probability map 214, adaptive sampling module 104 may assign both the probability score at the location of the extracted coarse feature 206, as well as an area score around the area of the feature location that is multiplied by a Gaussian weight according to the distance to the feature location.

For example, given a feature $x_k^i$ and its importance weight $w_i$, its surrounding area will also receive an area score $$w_i e^{-\frac{(x - x_k^i)^2}{2\sigma^2}}.$$

This area score may be calculated by adaptive sampling module 104 by convoluting the initial object probability map 214 with a Gaussian kernel $$e^{-\frac{d^2}{2\sigma^2}}.$$

Figure 3:
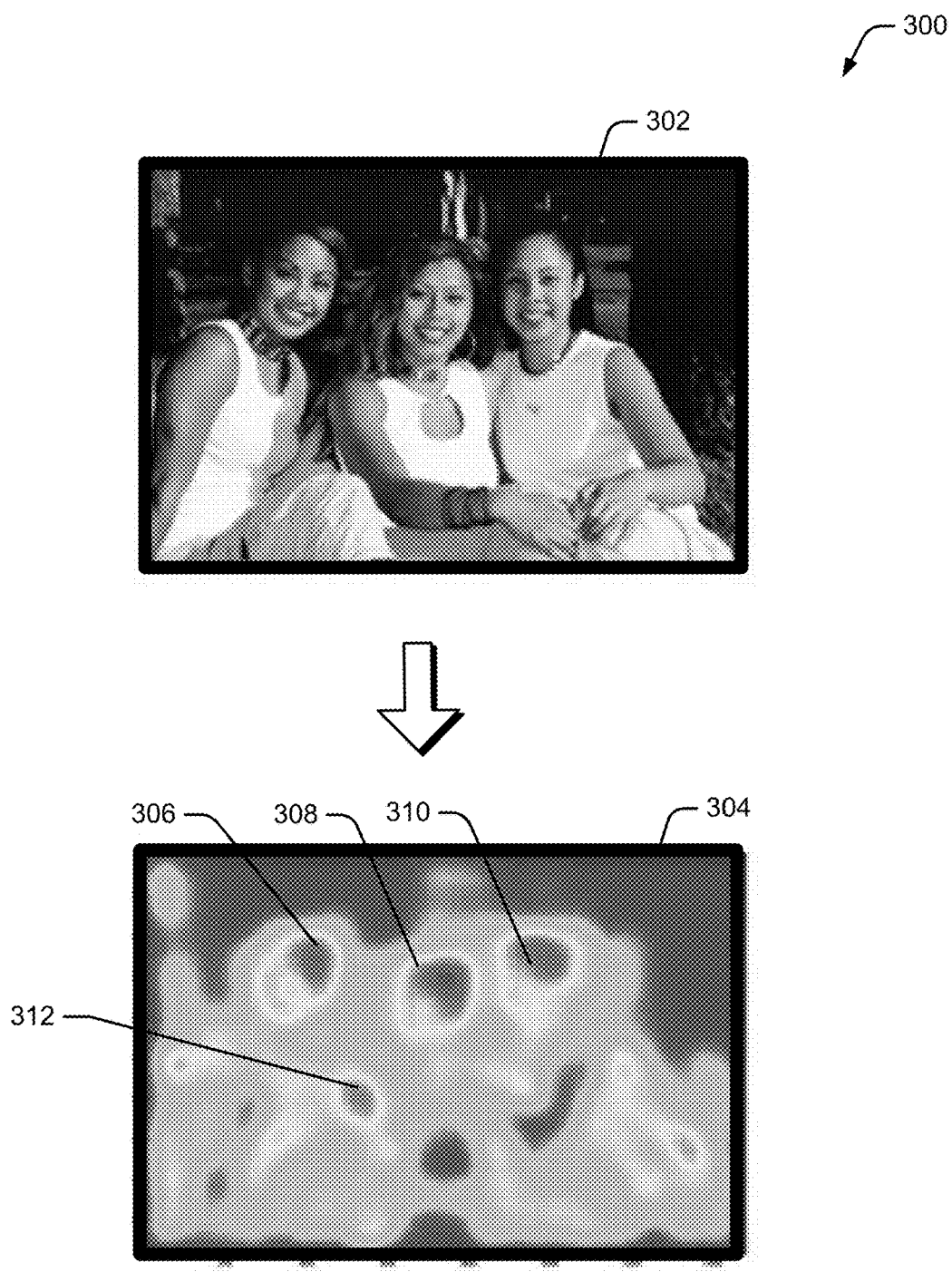
FIG. 3 illustrates an example of an image and an object probability map of the image generated by adaptive sampling module.

As an example of an object probability map, consider FIG. 3 which illustrates an example 300 of an image 302 and an object probability map 304 of the image generated by adaptive sampling module 104. In this example, image 302 includes faces corresponding to three different women. When image 302 is passed to adaptive sampling module 104, adaptive sampling module 104 extracts features from image 302 and generates object probability map 304 using the extracted features and feature vocabulary 210.

Object probability map 304 indicates the probabilities that an object may occur at each location in image 302. In this example, object probability map 304 uses different shading to shade the object probability map based on the probability scores assigned to the particular location. For example, areas with higher probability scores may be shaded darkly or using a specific color, whereas areas with lower probability scores may be shaded lightly or using a different specific color.

Returning to FIG. 2, adaptive sampling module 104 extracts dense features 220 from the high-probability object regions 216 of image 202. The dense features 220 may be extracted using smaller sampling steps than the large sampling steps used to extract coarse features. The extracted dense features 220 enable adaptive sampling module 104 to more accurately determine whether or not an object exists in the high-probability object regions 216. In some cases, adaptive sampling module 104 does not extract dense features 220 from the low-probability object regions 218 of image 202. It is to be appreciated, therefore, that this greatly reduces the total number of features that are extracted by adaptive sampling module 104.

In one or more implementations, to extract dense features 220, adaptive sampling module 104 extracts the dense features 220 if the associated probability score is greater than a predetermined threshold. For example, adaptive sampling module 104 can scan image 202 with a small sampling steps. Then, given a location c that is visited during the scan, if the probability score at c in object probability map 214 is p(c), then the feature 220 at c will be extracted and sampled with probability p(c). For example, a feature 220 will be extracted by adaptive sampling module 104 if $p(c) > T_p$, where $T_p$ is the predetermined threshold. Alternately, if $p(c) < T_p$, then the feature 220 will not be extracted.

Returning to FIG. 3, note that object probability map 304 identifies high-probability object regions 306, 308, 310, and 312 as being likely to contain a face. This is indicated by these regions being shaded more darkly than other areas of object probability map 304, which correspond to low-probability object regions. Thus, in this example, adaptive sampling module 104 extracts dense features from the high-probability object regions 306, 308, 310, and 312.

Adaptive sampling module 104 may then detect one of more objects 222 in image 202 based on the extracted dense features 220. For example, in FIG. 3, adaptive sampling module 104 may be able to accurately detect objects at high-probability object regions 306, 308, and 310 (which correspond to the faces of the three women in image 302) based on the extracted features. Similarly, adaptive sampling module 104 may be able to detect that objects are not located at high-probability region 312, and thus eliminate this region from further consideration.

In some cases, however, adaptive sampling module 104 may be unable to positively identify one or more objects 222 based on the extracted dense features 220. For example, in FIG. 3 adaptive sampling module 104 may be unable to accurately detect whether high-probability object regions 306, 308, and 310 each include a face. Similarly, adaptive sampling module 104 may be unable to accurately detect whether high-probability object region 312 includes a face.

Figure 4:
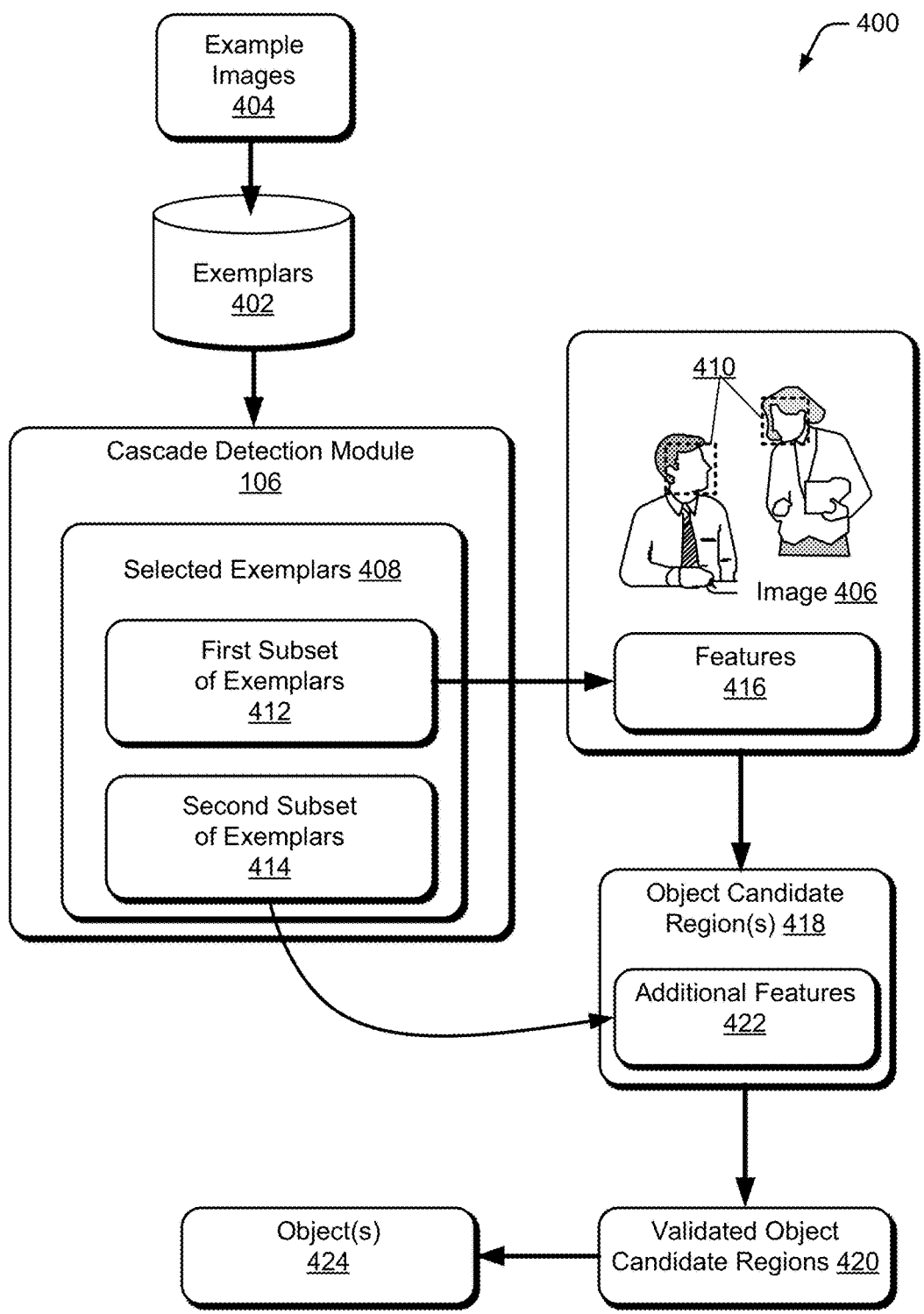
FIG. 4 illustrates a system in an example implementation in which the cascade detection module of FIG. 1 detects one or more objects in an image using a cascade of exemplars.

Thus, adaptive sampling module 104 may recursively perform the adaptive sampling techniques to extract sufficient features around high-probability object regions 216 until the regions may be detected as including an object, or eliminated from further consideration. For example, after the dense features 220 are extracted, adaptive sampling module 104 can generate a new object probability map, based on the extracted dense features, that indicates additional high-probability object regions in the image. Then, adaptive sampling module 104 may extract further dense features from the additional high-probability object regions of the image. In this way, adaptive sampling module 104 can perform the adaptive sampling techniques recursively, until most of the features from the true object regions are extracted while other features remain excluded Cascade Object Detection FIG. 4 illustrates a system 400 in an example implementation in which cascade detection module 106 of FIG. 1 detects one or more objects in an image using a cascade of exemplars.

In system 400, cascade detection module 106 uses a real-adaboost technique to learn a sequence of representative exemplar object instances as weak classifiers, and uses the learned exemplars to perform object detection for a new image. For example, the representative exemplar object instances may be faces that can be detected in digital images. Adaboost is a common term for "adaptive boosting" which can be implemented as a machine-learning algorithm or technique. In implementations described herein, real-adaboost technique is applied to an exemplar-based model to learn weak classifiers as a collection of exemplars 402 collected from example images 404, such as example faces or other objects that are then detectable when the exemplars 402 are applied to digital images.

Cascade detection module 106 receives an image 406, and selects exemplars 408 from the collection of exemplars 402 based on the image 406. For instance, cascade detection module 106 selects exemplars 408 because they are the most informative exemplars for object detection in image 406. Image 406 can be any type of digital image, which can be displayed on a display device of a computing system or device. Image 406 can include varying features, objects, and regions of the image, and as described herein, faces 410 of one or more persons that are detectable in the image by the cascade detection module 106.

In accordance with various implementations, cascade detection module 106 groups the selected exemplars 408 into multiple subsets. To do so, cascade detection module 106 groups the top N selected exemplars 408 into a first subset of exemplars 412, the $N^{th}$ to the $(N+M)^{th}$ selected exemplars 408 into a second subset of exemplars 414, and so on. In one or more implementations, the number of exemplars in the first subset of exemplars 412 is less than the number of exemplars in the second subset of exemplars 414. For example, from a group of 3,000 selected exemplars 408, the top 300 exemplars 408 may be grouped into the first subset of exemplars 412, the next 1,000 exemplars may be grouped into the second subset of exemplars 414, and the remaining 1,700 exemplars may be grouped into one or more additional subsets of exemplars (not pictured in FIG. 4). In one or more implementations, the first subset of exemplars includes the exemplars of selected exemplars 408 that are the most effective for detecting objects, and may be fixed when detecting objects in different images.

In order to detect an object in image 406, cascade detection module 106 extracts features 416 from multiple regions of image 406. The extracted features 416 correspond to interesting points of image 406 that can be extracted from the image to provide a feature description of the image. The feature description can be used to locate an object, such as faces 410, in the image 406 when the image contains many other objects.

Cascade detection module 106 can extract any type of local features from image 406, using a variety of different image extraction techniques. However, in one or more implementations cascade detection module 106, utilizes adaptive sampling module 104 to extract features 416 using adaptive sampling techniques, as described above with regards to FIGS. 2 and 3. For example, cascade detection module 106 can control adaptive sampling module 104 to extract coarse features from image 406, generate an object probability map based on the extracted coarse features, and extract dense features from high-probability object regions of image 406. Using the adaptive sampling techniques in combination with the cascade detection techniques speeds up the object detection process by reducing the total time needed for feature extraction. However, any type of feature extraction may be implemented by cascade detection module 106.

In a first stage of object detection, cascade detection module 106 detects one or more object candidate regions 418 using exemplars in the first subset of exemplars 418. To do so, cascade detection module 106 applies each of the exemplars in the first subset of exemplars 412 to the features 416 extracted from the multiple regions of image 406 to determine a confidence score for each exemplar as applied to each region of the image 406. The confidence score indicates whether the object, such as a face of a person, is detected in the region of the image 406 based on the exemplar. For example, a higher confidence score indicates that the object is detected in the region of the image based on the exemplar, and a lower confidence score indicates that the object is not detected in the region of the image based on the exemplar. Then, for each of the multiple regions, cascade detection module 106 sums all of the confidence scores to generate an object detection score that indicates whether the region likely includes the object (e.g., a face).

Finally, cascade detection module 106 compares the object detection score of each region to a predetermined threshold, and detects the object candidate regions 418 as the regions with objection detections scores above the predetermined threshold. In the first stage, cascade detection module 106 uses a low predetermined threshold to ensure that regions with relatively low object detection scores will be selected as object candidate regions. By using a low predetermined threshold, cascade detection module 106 ensures that true object regions will not be rejected in the first stage. However, a downside of using a low predetermined threshold is that some non-object regions may be selected as object candidate regions 418. However, as described below, these "false positives" may be removed by cascade detection module 106 in one or more subsequent validation stages.

Figure 5:
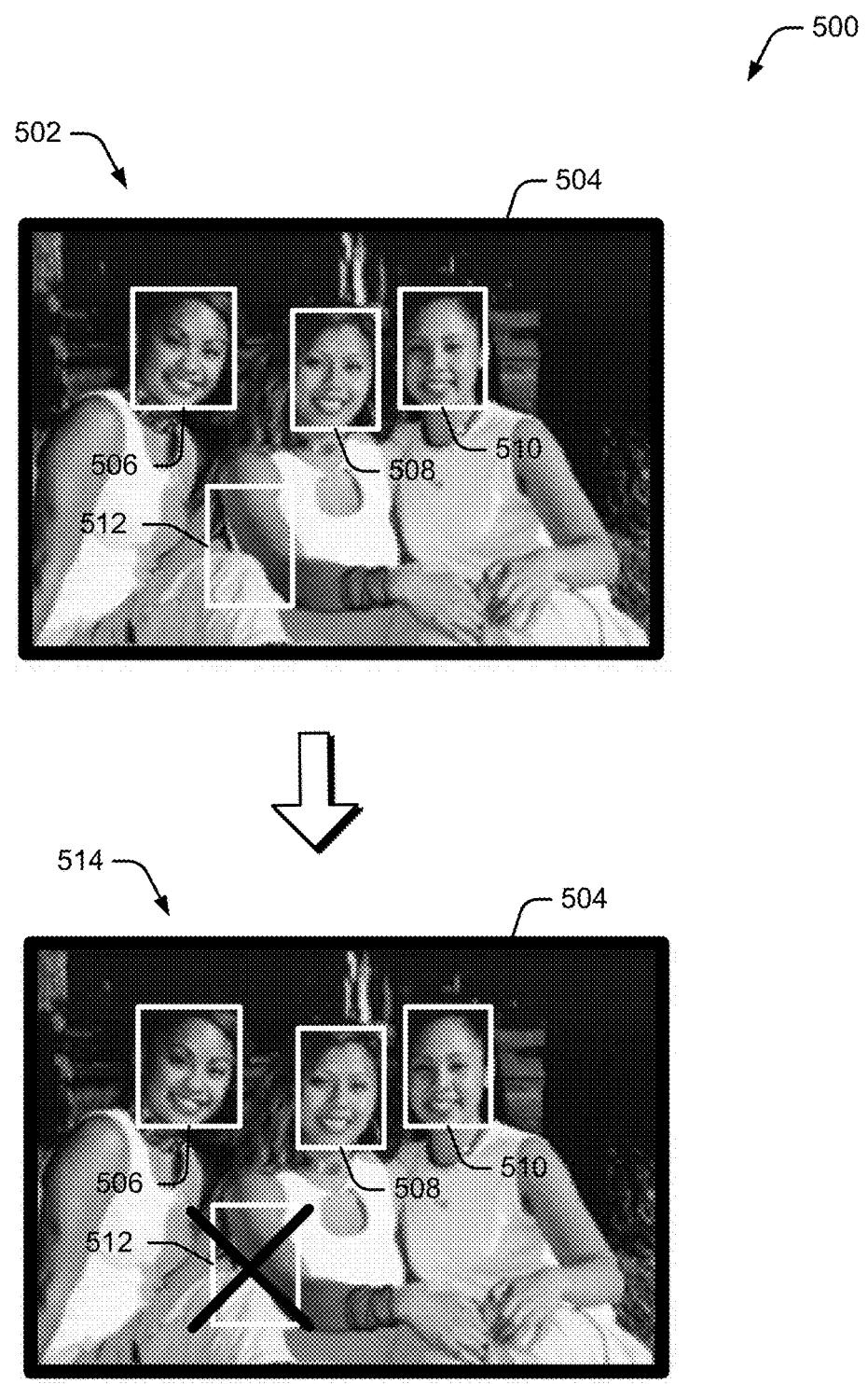
FIG. 5 illustrates an example of detecting and validating object candidate regions.

In order to better understand the concept of detecting object candidate regions, consider FIG. 5 which illustrates an example 500 of detecting and validating object candidate regions.

In this example, at a first stage 502, cascade detection module 106 extracts features from regions of image 504, which in this example includes faces of three women. Next, cascade detection module 106 applies exemplars from the first subset of exemplars 412 to multiple regions of image 504 to detect object candidate regions 418. In this example, cascade detection module 106 detects object candidate regions 506, 508, 510, and 512. Note that object candidate regions 506, 508, and 510 each correspond to a face of one of the three women in image 504. However, object candidate region 512 does not correspond to a face. As noted above, in the first stage the predetermined threshold is low, and thus while applying just a subset of exemplars enables detection of three objects candidate regions, it also may result in a false positive by detecting a non-object region as an object candidate region.

Returning to FIG. 4, in one or more validation stages, cascade detection module 106 validates the object candidate regions 418 to generate validated object candidate regions 420.

To generate the validated object candidate regions 420, cascade detection module 106 extracts additional features 422 from the object candidate regions 418 determined in the first stage. In one or more implementations, cascade detection module 106 may extract features that are denser than the features extracted in the first stage. For example, cascade detection module 106 may use a smaller sampling step to extract the additional features 422. While extracting dense features takes some additional time, it is still faster than conventional solutions because the dense features are only extracted from the object candidate regions. Further, only the features that were not extracted in the first stage may be extracted in the second stage, which also increases the speed of the extraction process.

Next, cascade detection module 106 validates the object candidate regions using the exemplars from both the first subset of exemplars 412 and the second subset of exemplars 414. To validate the object candidate regions, cascade detection module 106 applies each of the exemplars in the first subset of exemplars 412 and the second subset of exemplars 414 to the features 416 and the additional features 422 extracted from each object candidate region 418. Then, cascade detection module 106 determines a confidence score for each exemplar as applied to the object candidate region 418. The confidence score of each exemplar is an indication of whether the object, such as a face of a person, is detected in the object candidate region 418 based on the exemplar. For example, a higher confidence score indicates that the object is detected in the object candidate region 418 based on the exemplar, and a lower confidence score indicates that the object is not detected in the object candidate region 418 based on the exemplar. Then, cascade detection module 106 sums all of the confidence scores to generate an object detection score that indicates whether the object candidate region likely includes the object (e.g., a face).

Next, to validate the object candidate regions 418, cascade detection module 106 compares the object detection score of each of the object candidate regions 418 to an additional predetermined threshold. Object candidate regions 418 with object detection scores greater than the additional predetermined threshold are validated by cascade detection module 106 as validated object candidate regions 420. However, object candidate regions 418 with object detection scores less than the additional predetermined threshold are detected as false positives and removed by cascade detection module 106.

In some implementations, the additional predetermined threshold is higher than the predetermined threshold used in the first stage in order to increase the likelihood of detecting false positives in the validation stage. It is to be appreciated, however, that because additional features are extracted and a greater number of exemplars are applied in the validation stage, that it is unlikely that a true object region will be rejected in the validation stage.

Returning to FIG. 5, in a validation stage 514, cascade detection module 106 extracts additional features from object candidate regions 506, 508, 510, and 512, and applies exemplars from the first subset of exemplars 412 and the second subset of exemplars 414 to the features and additional features extracted from each object candidate region. In this case, cascade detection module 106 validates object candidate regions 506, 508, and 510, and identifies object candidate region 512 as a false positive. Thus, cascade detection module 106 removes object candidate region 512 as indicated by the black "x" over object candidate region 512.

Finally, cascade detection module 106 detects one or more objects 424 in the validated object candidate regions 420. If, however, additional validation is needed, cascade detection module 106 may repeat this process for one or more additional validation stages.

Example Procedures

The following discussion describes procedures for adaptive sampling techniques (FIG. 6) and for cascade object detection techniques (FIG. 7) that may be implemented utilizing the systems and devices described herein. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1, 2, and 4.

Figure 6:
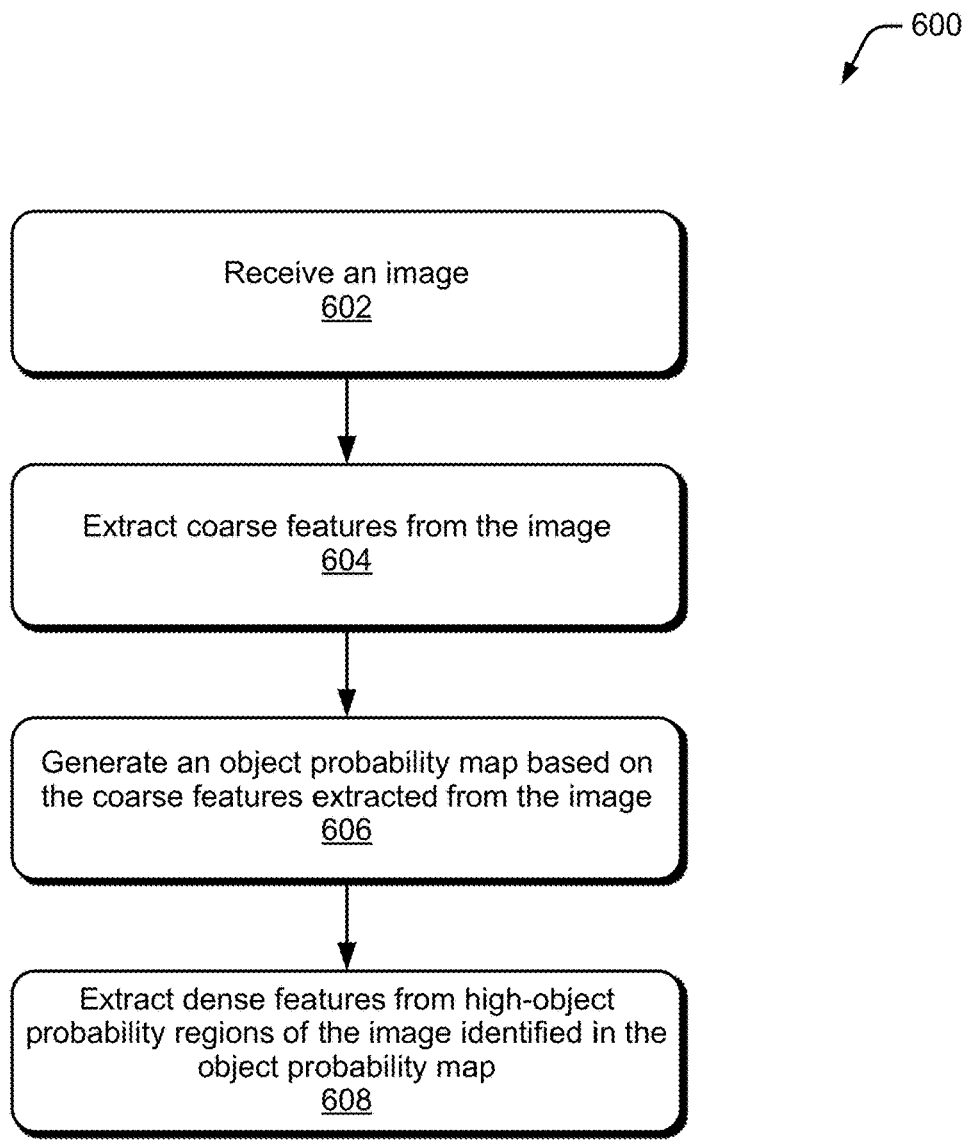
FIG. 6 illustrates a procedure in an example implementation in which an adaptive sampling module extracts features from an image.

FIG. 6 illustrates a procedure 600 in an example implementation in which an adaptive sampling module extracts features from an image.

At 602, an image is received. For example, adaptive sampling module 104 (FIG. 1) receives an image 202 (FIG. 2).

At 604, coarse features are extracted from the image. For example, adaptive sampling module 104 extracts coarse features 206 from image 202.

At 606, an object probability map is generated based on the coarse features extracted from the image. For example, adaptive sampling module 104 generates an object probability map 214 based on the coarse features 206 extracted from image 202. The object probability map 214 indicates the probabilities that an object may appear at each location in image 202. The object probability map 214 may include high-probability object regions 216 that correspond to regions of image 202 that are likely to contain the object, and low-probability object regions 218 that correspond to regions of image 202 that are unlikely to contain the object.

In one or more implementations, to generate the object probability map 214, adaptive sampling module 104 accumulates the importance weights 212 assigned to the extracted coarse features 206 to generate probability scores, and assigns the probability sores to positions on the objet probability map 214 that correspond to the location of the extracted features 206 in image 202.

At 608, dense features are extracted from high-probability object regions of the image identified in the object probability map. For example, adaptive sampling module 104 extracts dense features 220 from high-probability object regions 216 identified in object probability map 214. In one or more implementations, to extract dense features 220, adaptive sampling module 104 extracts the dense features 220 if the associated probability score is greater than a predetermined threshold Adaptive sampling module 104 may then identify one of more objects 222 in image 202 based on the extracted dense features 220. In some cases, adaptive sampling module 104 may be unable to positively identify object 222 based on the extracted dense features 220. In this case, adaptive sampling module 104 may recursively perform the adaptive sampling techniques to extract sufficient features around object regions while suppressing the number of non-informative features.

Figure 7:
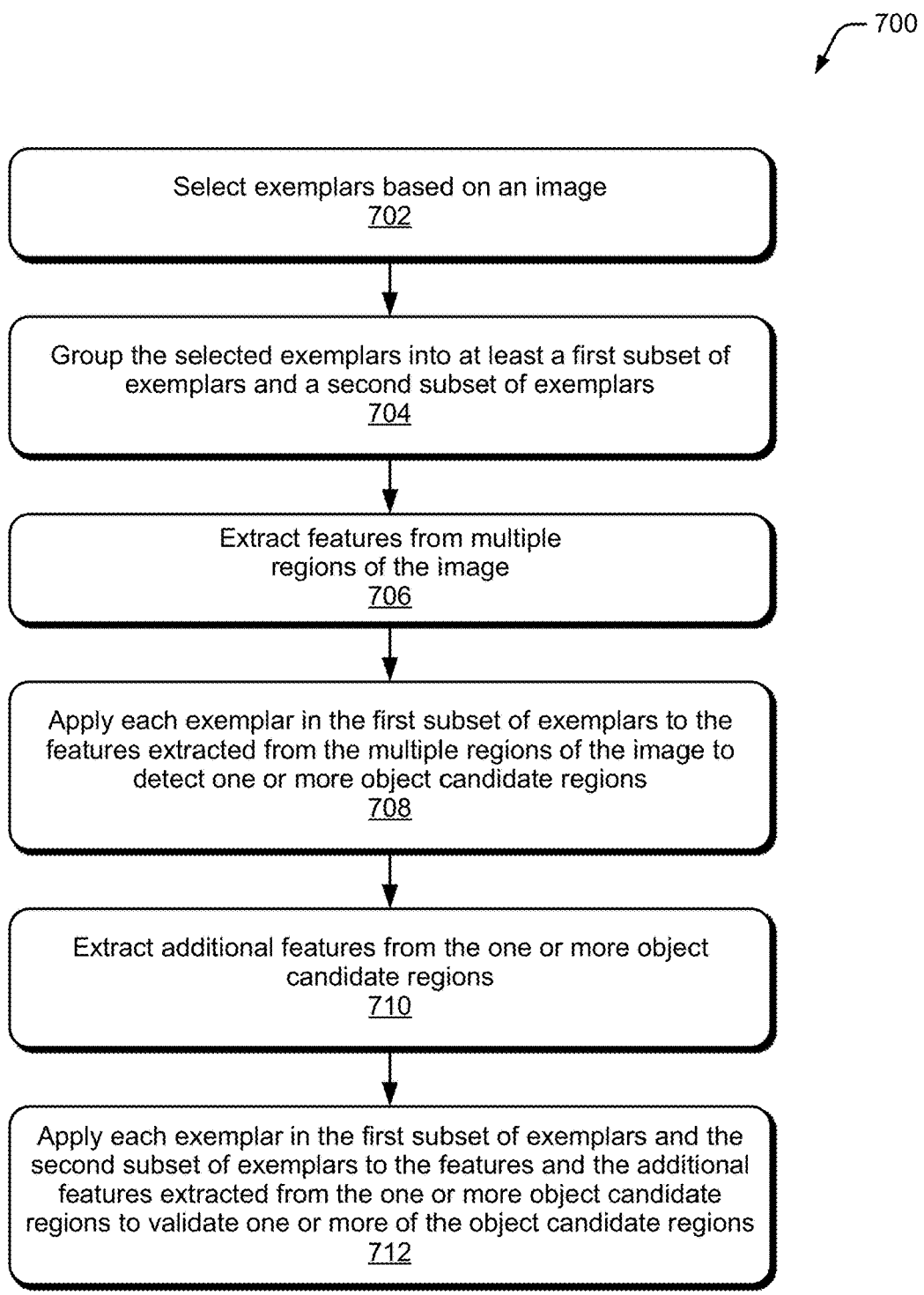
FIG. 7 illustrates a procedure in an example implementation in which a cascade detection module is used to detect one or more objects in an image.

FIG. 7 illustrates a procedure 700 in an example implementation in which a cascade detection module is used to detect one or more objects in an image.

At 702, exemplars are selected based on an image. For example, cascade detection module 106 (FIG. 1) selects exemplars 408 (FIG. 4) based on an image 406.

At 704, the selected exemplars are grouped into at least a first subset of exemplars and a second subset of exemplars. For example, cascade detection module 106 groups the selected exemplars 408 into at least a first subset of exemplars 412 and a second subset of exemplars 414.

At 706, features are extracted from multiple regions of the image. For example, cascade detection module 106 extracts features 416 from multiple regions of image 406. In one or more implementations, cascade detection module 106 employs adaptive sampling module 104 to extract features 416 from multiple regions of image 406.

At 708, each exemplar in the first subset of exemplars is applied to the features extracted from the multiple regions of the image to detect one or more object candidate regions. For example, cascade detection module 106 applies each exemplar in the first subset of exemplars 412 to features 416 extracted from the multiple regions of image 406 to detect one or more object candidate regions 418.

At 710, additional features are extracted from the one or more object candidate regions. For example, cascade detection module 106 extracts additional features 422 from the one or more object candidate regions 418.

At 712, each exemplar in the first subset of exemplars and the second subset of exemplars is applied to the features and the additional features extracted from the one or more object candidate regions to validate one or more of the object candidate regions. For example, adaptive sampling module 104 applies each exemplar in the first subset of exemplars 412 and the second subset of exemplars 414 to the features 416 and the additional features 422 extracted from the one or more object candidate regions 418 to validate the one or more object candidate regions.

Then, cascade detection module 106 may detect one or more objects 424 in the validated object candidate regions 420. If, however, additional validation is needed, cascade detection module 106 may repeat this process for one or more additional validation stages.

Having described example procedures in accordance with one or more implementations, consider now an example system and device that can be utilized to implement the various techniques described herein.

Example System and Device

FIG. 8 illustrates an example system generally at 800 that includes an example computing device 802 that is representative of one or more computing systems and/or devices that may implement the various techniques described herein. This is illustrated through inclusion of adaptive sampling module 104 and cascade detection module 106, which operates as described above. The computing device 802 may be, for example, a server of a service provider, a device associated with a client (e.g., a client device), an on-chip system, and/or any other suitable computing device or computing system.

The example computing device 802 is illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device implementation, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A computer-implemented method comprising:
selecting exemplar classifiers based on an image, the exemplar classifiers taken from example images as examples of an object that is detectable in each example image;
grouping the selected exemplar classifiers into at least a first subset of exemplar classifiers and a second subset of exemplar classifiers;
extracting features from one or more regions of the image;

applying each exemplar classifier in the first subset of exemplar classifiers to the features extracted from the one or more regions of the image to detect one or more object candidate regions;

extracting additional features from the one or more object candidate regions; and applying each exemplar classifier in the first subset of exemplar classifiers and the second subset of exemplar classifiers to the features and the additional features extracted from the one or more object candidate regions to validate at least one of the one or more of the object candidate regions.

2. The computer-implemented method of claim 1, wherein the number of exemplar classifiers in the first subset of exemplar classifiers is less than the number of exemplar classifiers in the second subset of exemplar classifiers.

3. The computer-implemented method of claim 1, wherein the applying each exemplar classifier in the first subset of exemplar classifiers to the features extracted from the one or more regions of the image to detect the one or more object candidate regions, further comprises determining a confidence score for each exemplar classifier as applied to each of the one or more regions, the confidence score indicating whether an object is detected in the region based on the exemplar classifier.

4. The computer-implemented method of claim 3, wherein the applying each exemplar classifier in the first subset of exemplar classifiers to the features extracted from the one or more regions of the image to detect the one or more object candidate regions, further comprises:

for each of the one or more regions, summing the confidence scores of each exemplar classifier to generate an object detection score;

comparing the object detection score for each region to a predetermined threshold; and detecting the one or more object candidate regions as regions with object detection scores above the predetermined threshold.

5. The computer-implemented method of claim 1, wherein validating the at least one of the one or more object candidate regions further comprises detecting at least one of the object candidate regions as a false positive region.

6. The computer-implemented method of claim 5, wherein validating the at least one of the one or more object candidate regions further comprises removing the false positive region from the one or more object candidate regions.

7. The computer-implemented method of claim 1, wherein applying each exemplar classifier in the first subset of exemplar classifiers and the second subset of exemplar classifiers to the features and the additional features extracted from the one or more object candidate regions to validate at least one of the one or more of the object candidate regions further comprises:

determining a confidence score for each exemplar classifier in the first group of exemplar classifiers and the second group of exemplar classifiers as applied to each of the one or more object candidate regions, the confidence score indicating whether an object is detected in the one or more object candidate region based on the exemplar classifier;

for each of the one or more object candidate regions, summing the confidence scores of each exemplar classifier to generate an object detection score;

comparing the object detection score for each of the one or more object candidate region to a predetermined threshold;

validating at least one of the one or more object candidate regions with object detection scores above the predetermined threshold; and removing at least one of the one or more object candidate regions with object detection scores below the predetermined threshold.

8. The computer-implemented method of claim 1, wherein the additional features extracted from the one or more object candidate regions are denser than the features extracted from the one or more regions of the image.

9. The computer-implemented method of claim 1, wherein the additional features are extracted using smaller sampling steps than sampling steps used to extract the features.

10. The computer-implemented method of claim 1, wherein the extracting the features from the image further comprises:

extracting coarse features from the image;

generating an object probability map based on the extracted coarse features, the object probability map indicating high-probability object regions in the image that are likely to contain an object; and extracting dense features from the high-probability object regions of the image identified in the object probability map.

11. The computer-implemented method of claim 1, wherein the object comprises a face.

12. A system comprising:

one or more processors;

one or more memories having instructions stored thereon that, responsive to execution by the one or more processors, perform operations comprising:

selecting exemplar classifiers based on an image, the exemplar classifiers taken from example images as examples of an object that is detectable in each example image;

grouping the selected exemplar classifiers into at least a first subset of exemplar classifiers and a second subset of exemplar classifiers;

extracting features from one or more regions of the image;

applying each exemplar classifier in the first subset of exemplar classifiers to the features extracted from the one or more regions of the image to detect one or more object candidate regions;

extracting additional features from the one or more object candidate regions; and applying each exemplar classifier in the first subset of exemplar classifiers and the second subset of exemplar classifiers to the features and the additional features extracted from the one or more object candidate regions to validate at least one of the one or more of the object candidate regions.

13. The system of claim 12, wherein the number of exemplar classifiers in the first subset of exemplar classifiers is less than the number of exemplar classifiers in the second subset of exemplar classifiers.

14. The system of claim 12, wherein the applying each exemplar classifier in the first subset of exemplar classifiers to the features extracted from the one or more regions of the image to detect the one or more object candidate regions, further comprises:

determining a confidence score for each exemplar classifier as applied to each of the one or more regions, the confidence score indicating whether an object is detected in the region based on the exemplar classifier;

for each of the one or more regions, summing the confidence scores of each exemplar classifier to generate an object detection score;

comparing the object detection score for each region to a predetermined threshold; and detecting the one or more object candidate regions as regions with object detection scores above the predetermined threshold.

15. The system of claim 12, wherein validating the at least one of the one or more object candidate regions further comprises detecting at least one of the one or more object candidate regions as a false positive region, and removing the false positive region from the one or more object candidate regions.

16. The system of claim 12, wherein applying each exemplar classifier in the first subset of exemplar classifiers and the second subset of exemplar classifiers to the features and the additional features extracted from the one or more object candidate regions to validate at least one of the one or more of the object candidate regions further comprises:

determining a confidence score for each exemplar classifier in the first group of exemplar classifiers and the second group of exemplar classifiers as applied to each of the one or more object candidate regions, the confidence score indicating whether an object is detected in the one or more object candidate region based on the exemplar classifier;

for each of the one or more object candidate regions, summing the confidence scores of each exemplar classifier to generate an object detection score;

comparing the object detection score for each of the one or more object candidate regions to a predetermined threshold;

validating at least one of the one or more object candidate regions with object detection scores above the predetermined threshold; and removing at least one of the one or more object candidate regions with object detection scores below the predetermined threshold.

17. The system of claim 12, wherein the additional features extracted from the one or more object candidate regions are denser than the features extracted from the one or more regions of the image.

18. The system of claim 12, wherein the additional features are extracted using smaller sampling steps than sampling steps used to extract the features.

19. The system of claim 12, wherein the object comprises a face.

20. A system implemented at least partially in hardware, the system comprising:

a cascade detection module to:

select exemplar classifiers based on an image, the exemplar classifiers taken from example images as examples of an object that is detectable in each example image;

group the selected exemplar classifiers into at least a first subset of exemplar classifiers and a second subset of exemplar classifiers;

extract features from one or more regions of the image;

apply each exemplar classifier in the first subset of exemplar classifiers to the features extracted from the one or more regions of the image to detect one or more object candidate regions;

extract additional features from the one or more object candidate regions; and apply each exemplar classifier in the first subset of exemplar classifiers and the second subset of exemplar classifiers to the features and the additional features extracted from the one or more object candidate regions to validate at least one of the one or more of the object candidate regions.

* * * * *